United States Patent
Ozaki et al.

(10) Patent No.: US 10,449,656 B2
(45) Date of Patent: Oct. 22, 2019

(54) CONTINUOUS-GENERATION GEAR-WHEEL GRINDING METHOD

(71) Applicants: TOYOTA MOTOR HOKKAIDO INC., Tomakomai-shi, Hokkaido (JP); NORITAKE CO., LIMITED, Nagoya-shi, Aichi (JP); YUSHIRO CHEMICAL INDUSTRY CO., LTD., Kouza-gun, Kanagawa (JP)

(72) Inventors: Masatoshi Ozaki, Tomakomai (JP); Toru Yamazaki, Tomakomai (JP); Kazuhiro Horimi, Nagoya (JP); Tatsuyoshi Yasuda, Nagoya (JP); Yoshihisa Hayakawa, Kouza-gun (JP); Sho Nakajima, Kouza-gun (JP)

(73) Assignees: TOYOTA MOTOR HOKKAIDO INC., Tomakomai-shi (JP); NORITAKE CO., LIMITED, Nagoya-shi (JP); YUSHIRO CHEMICAL INDUSTRY CO., LTD., Kouza-gun (JP)

( * ) Notice: Subject to any disclaimer, the term of this patent is extended or adjusted under 35 U.S.C. 154(b) by 432 days.

(21) Appl. No.: 14/893,723

(22) PCT Filed: May 28, 2014

(86) PCT No.: PCT/JP2014/064197
§ 371 (c)(1),
(2) Date: Nov. 24, 2015

(87) PCT Pub. No.: WO2014/192837
PCT Pub. Date: Dec. 4, 2014

(65) Prior Publication Data
US 2016/0107291 A1 Apr. 21, 2016

(30) Foreign Application Priority Data
May 31, 2013 (JP) .................................. 2013-115567

(51) Int. Cl.
B24B 53/075 (2006.01)
B23F 21/02 (2006.01)
(Continued)

(52) U.S. Cl.
CPC .............. *B24B 53/075* (2013.01); *B23F 5/04* (2013.01); *B23F 21/02* (2013.01); *B24B 55/02* (2013.01); *B24D 3/14* (2013.01)

(58) Field of Classification Search
CPC ........ B23F 5/04; B23F 23/1225; B24B 55/02; B24B 53/075; B24B 53/085
See application file for complete search history.

(56) References Cited

U.S. PATENT DOCUMENTS 3,589,073 A    6/1971   Okamoto et al.
5,863,308 A    1/1999   Qi et al.
(Continued)

FOREIGN PATENT DOCUMENTS

EP    0355630 A1    2/1990
JP    H07-100710 A  4/1995
(Continued)

OTHER PUBLICATIONS

Aug. 19, 2014 Search Report issued in International Patent Application No. PCT/JP2014/064197.
(Continued)

*Primary Examiner* — Monica S Carter
*Assistant Examiner* — Lauren M Beronja
(74) *Attorney, Agent, or Firm* — Oliff PLC

(57) ABSTRACT

A continuous-generation gear grinding method of conducting a gear grinding process such that while a thread-shaped grinding wheel is rotated around an axial center thereof and fed in an axial center direction, a position coming into contact with abrasive grains is constantly changed in the presence of a water-soluble grinding fluid by performing a
(Continued)

grinding feed in a direction parallel to an axial center of a gear blank and by serially rotating the gear blank around the axial center, the grinding wheel being a vitrified grinding wheel having abrasive grains bonded by a vitrified bond with pores formed among the abrasive grains, and the abrasive grains having a grain size of F120 to F180.

6 Claims, 8 Drawing Sheets

(51) Int. Cl.
    *B23F 5/04*     (2006.01)
    *B24B 55/02*     (2006.01)
    *B24D 3/14*     (2006.01)

(56) References Cited

U.S. PATENT DOCUMENTS

| | | | |
|---|---|---|---|
| 6,562,089 B1 | 5/2003 | Iwai et al. | |
| 7,837,533 B2* | 11/2010 | Brand | B23H 7/12 451/10 |
| 9,393,671 B2* | 7/2016 | Webster | B24B 53/005 |
| 2005/0245176 A1* | 11/2005 | Thyssen | B24B 53/075 451/56 |
| 2005/0256014 A1* | 11/2005 | Sherman | C08G 65/2609 508/579 |
| 2006/0025050 A1 | 2/2006 | Yanase et al. | |
| 2007/0202776 A1* | 8/2007 | Gretler | B24B 55/02 451/5 |
| 2008/0085660 A1* | 4/2008 | Orlhac | B24D 3/20 451/28 |
| 2008/0268750 A1* | 10/2008 | Fisher | B23F 15/06 451/5 |
| 2011/0081844 A1 | 4/2011 | Dremel et al. | |
| 2014/0141699 A1 | 5/2014 | Yanase et al. | |
| 2016/0023328 A1* | 1/2016 | Flaschberger | B24B 53/07 51/309 |

FOREIGN PATENT DOCUMENTS

| | | |
|---|---|---|
| JP | 4202306 B2 | 12/2008 |
| JP | 2011-079125 A | 4/2011 |
| WO | 2013/008485 A1 | 1/2013 |

OTHER PUBLICATIONS

Dave Long; "Norton Vitrium3 White Paper;" May 28, 2013; pp. 1-9.
Mar. 15, 2017 Search Report issued in European Patent Application No. 14803578.5.

\* cited by examiner

- P11 — CROSS SECTION IMAGING
- P12 — IMAGE PROCESSING
- P13 — HISTOGRAM CALCULATION
- P14 — VARIATION COEFFICIENT CALCULATION

CUMULATE TOTAL BASED ON WHITE AREA RATIO OF EACH CROSS-SECTIONAL IMAGE

| TEST GRINDING WHEEL | INDICATION OF GRINDING WHEEL | VARIATION COEFFICIENT | GRINDING TEST RESULT |
|---|---|---|---|
| EXAMPLE 1 | MA/SN120H+10V36P | 17.0 | WITHOUT BURN |
| EXAMPLE 2 | MA/SN150H+10V36P | 15.8 | WITHOUT BURN |
| EXAMPLE 3 | MA/SN180H+10V36P | 15.2 | WITHOUT BURN |
| COMPARISON EXAMPLE 1 | MA/SN80H+10V36P | 24.0 | BURN OCCURS AT 16TH GEAR |

| ITEM | STANDARD | | 1cut | 20cut | 40cut |
|---|---|---|---|---|---|
| TOOTH PROFILE PRESSURE ANGLE ERROR | +6 | L | −0.4 | −0.3 | −0.6 |
| | −6 | R | −0.7 | −0.5 | −0.6 |
| TOOTH PROFILE BIAS | +2 | L | −5.6 | −5.8 | −5.7 |
| | −10 | | | | |
| | +10 | R | +5.1 | +4.9 | +4.3 |
| | −2 | | | | |
| TOOTH PROFILE ROUNDNESS | +4 | L | +1.5 | +2.1 | +2.0 |
| | 0 | R | +2.3 | +2.1 | +2.1 |
| LEAD ANGLE ERROR | +6 | L | −2.2 | −1.5 | −0.5 |
| | −6 | R | +1.5 | +1.4 | +1.2 |
| CROWNING | 4 | L | 2.1 | 2.1 | 2.4 |
| | 0 | R | 2.1 | 2.3 | 1.9 |
| ADJACENT PITCH ERROR | 10 | L | 1.8 | 2.1 | 1.6 |
| | | R | 2.0 | 2.2 | 1.5 |
| SINGLE PITCH ERROR | 9 | L | 2.5 | 2.1 | 2.5 |
| | | R | 2.3 | 1.8 | 2.6 |
| CUMULATIVE PITCH ERROR | 37 | L | 34.7 | 30.6 | 26.1 |
| | | R | 36.8 | 20.1 | 20.0 |

FIG.10

| SAMPLE NO. | 1 | 2 | 3 | 4 | 5 | 6 | 7 | 8 |
|---|---|---|---|---|---|---|---|---|
| DODECANEDIOIC ACID | 1 | ← | ← | ← | ← | ← | ← | ← |
| LINEAR FATTY ACID | 3 | ← | ← | ← | ← | ← | ← | ← |
| BRANCHED FATTY ACID | 2 | ← | ← | ← | ← | ← | ← | ← |
| ALIPHATIC DICARBOXYLIC ACID | 0.8 | ← | ← | ← | ← | ← | ← | ← |
| RICINOLEIC ACID CONDENSATE | 11 | ← | ← | ← | ← | ← | ← | ← |
| 2-AMONO-2-METHYL-1-PROPANOL | 4 | ← | ← | ← | ← | ← | ← | ← |
| TRIISOPROPANOLAMINE | 7 | ← | ← | ← | ← | ← | ← | ← |
| MONOISOPROPANOLAMINE | 2 | ← | ← | ← | ← | ← | ← | ← |
| DIBENZYLAMINE | 2 | ← | ← | ← | ← | ← | ← | ← |
| MINERAL OIL AND/OR ESTER COMPOUND | 31 | 30.8 | 30.5 | 29 | 25 | 16 | 10 | 6 |
| SULFUR-BASED EXTREME-PRESSURE AGENT | 20 | ← | ← | ← | ← | ← | ← | ← |
| HIGHER ALCOHOL | 7 | ← | ← | ← | ← | ← | ← | ← |
| WATER | 9 | ← | ← | ← | ← | ← | ← | ← |
| SILICONE-BASED DEFOAMING AGENT | 0.2 | ← | ← | ← | ← | ← | ← | ← |
| NON-IONIC SURFACTANT AND/OR POLYETHERS, POLYOXYETHYLENE ALKYL ETHER TYPE ※1 | 0 | 0.2 | 0.5 | 2 | 6 | 15 | 20 | 25 |
| TOTAL (MASS%) | 100 | ← | ← | ← | ← | ← | ← | ← |
| DISPERSIBILITY EVALUATION RESULT | × | × | △ | △ | ○ | ○ | ○ | ○ |

※1:BASF Lutensol XL40

FIG.11

| SAMPLE NO. | 9 | 10 | 11 | 12 | 13 | 14 | 15 | 16 |
|---|---|---|---|---|---|---|---|---|
| DODECANEDIOIC ACID | 1 | ← | ← | ← | ← | ← | ← | ← |
| LINEAR FATTY ACID | 3 | ← | ← | ← | ← | ← | ← | ← |
| BRANCHED FATTY ACID | 2 | ← | ← | ← | ← | ← | ← | ← |
| ALIPHATIC DICARBOXYLIC ACID | 0.8 | ← | ← | ← | ← | ← | ← | ← |
| RICINOLEIC ACID CONDENSATE | 11 | ← | ← | ← | ← | ← | ← | ← |
| 2-AMONO-2-METHYL-1-PROPANOL | 4 | ← | ← | ← | ← | ← | ← | ← |
| TRIISOPROPANOLAMINE | 7 | ← | ← | ← | ← | ← | ← | ← |
| MONOISOPROPANOLAMINE | 2 | ← | ← | ← | ← | ← | ← | ← |
| DIBENZYLAMINE | 2 | ← | ← | ← | ← | ← | ← | ← |
| MINERAL OIL AND/OR ESTER COMPOUND | 31 | 30.8 | 30.5 | 29 | 25 | 16 | 10 | 6 |
| SULFUR-BASED EXTREME-PRESSURE AGENT | 20 | ← | ← | ← | ← | ← | ← | ← |
| HIGHER ALCOHOL | 7 | ← | ← | ← | ← | ← | ← | ← |
| WATER | 9 | ← | ← | ← | ← | ← | ← | ← |
| SILICONE-BASED DEFOAMING AGENT | 0.2 | ← | ← | ← | ← | ← | ← | ← |
| NON-IONIC SURFACTANT AND/OR POLYETHERS, POLYOXYETHYLENE PHENYL ETHER TYPE ※2 | 0 | 0.2 | 0.5 | 2 | 6 | 15 | 20 | 25 |
| TOTAL (MASS%) | 100 | ← | ← | ← | ← | ← | ← | ← |
| DISPERSIBILITY EVALUATION RESULT | × | × | △ | △ | ○ | ○ | ○ | ○ |

※2:AOKI OIL INDUSTRIAL BULAUNON DP-9

FIG.12

| SAMPLE NO. | 17 | 18 | 19 | 20 | 21 | 22 | 23 | 24 |
|---|---|---|---|---|---|---|---|---|
| DODECANEDIOIC ACID | 1 | ← | ← | ← | ← | ← | ← | ← |
| LINEAR FATTY ACID | 3 | ← | ← | ← | ← | ← | ← | ← |
| BRANCHED FATTY ACID | 2 | ← | ← | ← | ← | ← | ← | ← |
| ALIPHATIC DICARBOXYLIC ACID | 0.8 | ← | ← | ← | ← | ← | ← | ← |
| RICINOLEIC ACID CONDENSATE | 11 | ← | ← | ← | ← | ← | ← | ← |
| 2-AMONO-2-METHYL-1-PROPANOL | 4 | ← | ← | ← | ← | ← | ← | ← |
| TRIISOPROPANOLAMINE | 7 | ← | ← | ← | ← | ← | ← | ← |
| MONOISOPROPANOLAMINE | 2 | ← | ← | ← | ← | ← | ← | ← |
| DIBENZYLAMINE | 2 | ← | ← | ← | ← | ← | ← | ← |
| MINERAL OIL AND/OR ESTER COMPOUND | 31 | 30.8 | 30.5 | 29 | 25 | 16 | 10 | 6 |
| SULFUR-BASED EXTREME-PRESSURE AGENT | 20 | ← | ← | ← | ← | ← | ← | ← |
| HIGHER ALCOHOL | 7 | ← | ← | ← | ← | ← | ← | ← |
| WATER | 9 | ← | ← | ← | ← | ← | ← | ← |
| SILICONE-BASED DEFOAMING AGENT | 0.2 | ← | ← | ← | ← | ← | ← | ← |
| NON-IONIC SURFACTANT AND/OR POLYETHERS, POLYOXYPROPYLENE GLYCOL TYPE ※3 | 0 | 0.2 | 0.5 | 2 | 6 | 15 | 20 | 25 |
| TOTAL (MASS%) | 100 | ← | ← | ← | ← | ← | ← | ← |
| DISPERSIBILITY EVALUATION RESULT | × | × | △ | △ | ○ | ○ | ○ | ○ |

※3: SANYO CHEMICAL INDUSTRIES, SANNIX PP-2000

FIG.13

| SAMPLE NO. | 25 | 26 | 27 | 28 | 29 | 30 |
|---|---|---|---|---|---|---|
| DODECANEDIOIC ACID | 1 | ← | ← | ← | ← | ← |
| LINEAR FATTY ACID | 3 | ← | ← | ← | ← | ← |
| BRANCHED FATTY ACID | 2 | ← | ← | ← | ← | ← |
| ALIPHATIC DICARBOXYLIC ACID | 0.8 | ← | ← | ← | ← | ← |
| RICINOLEIC ACID CONDENSATE | 11 | ← | ← | ← | ← | ← |
| 2-AMONO-2-METHYL-1-PROPANOL | 4 | ← | ← | ← | ← | ← |
| TRIISOPROPANOLAMINE | 7 | ← | ← | ← | ← | ← |
| TETRAMETHYL HEXAMETHYLENEDIAMINE | 2 | ← | ← | ← | ← | ← |
| DIBENZYLAMINE | 2 | ← | ← | ← | ← | ← |
| MINERAL OIL AND/OR ESTER COMPOUND | 51 | 45 | 40 | 30 | 25 | 0 |
| SULFUR-BASED EXTREME-PRESSURE AGENT | 0 | 0 | 5 | 15 | 20 | 50 |
| HIGHER ALCOHOL | 7 | ← | ← | ← | ← | ← |
| WATER | 9 | 9 | 9 | 9 | 9 | 6 |
| SILICONE-BASED DEFOAMING AGENT | 0.2 | ← | ← | ← | ← | ← |
| NON-IONIC SURFACTANT AND/OR POLYETHERS | 0 | 6 | 6 | 6 | 6 | 4 |
| TOTAL (MASS%) | 100 | ← | ← | ← | ← | ← |
| FRICTION COEFFICIENT | 0.30 | 0.28 | 0.25 | 0.14 | 0.12 | 0.12 |

CONTINUOUS-GENERATION GEAR-WHEEL GRINDING METHOD

TECHNICAL FIELD

The present invention relates to a technique enabling production of highly accurate gears by using a vitrified grinding wheel and a water-soluble grinding fluid in continuous-generation gear grinding.

BACKGROUND ART

As described in Patent Document 1, at the time of grinding of a highly accurate gear, gear grinding process is conducted such that while a thread-shaped grinding wheel is rotated around an axial center thereof and fed in an axial center direction, a position coming into contact with abrasive grains is changed by performing a grinding feed in a direction parallel to an axial center of a gear blank and by serially rotating the gear blank around the axial center in proposed continuous-generation gear grinding.

This continuous-generation gear grinding exclusively employs water-insoluble grinding fluid easily permeating a grinding point between the thread-shaped grinding wheel and the gear blank and excellent in washing performance of removing chips from a grinding wheel surface. For the continuous-generation gear grinding, the water-insoluble grinding fluid with low viscosity is recommended that has, for example, kinetic viscosity of 10 m²/sec (40° C.) or less so as to facilitate the permeation through the grinding point. However, a low-viscosity mineral oil contained in such a water-insoluble grinding fluid has high inflammability and may catch fire particularly under grinding conditions elevating the temperature of the grinding point and the chips. Therefore, it has been desired to switch the grinding fluid used in the continuous-generation gear grinding from the water-insoluble grinding fluid to water-soluble grinding fluid.

PRIOR ART DOCUMENT

Patent Document

Patent Document 1: Japanese Patent No. 4202306

SUMMARY OF THE INVENTION

Problem to be Solved by the Invention

In general, water-soluble grinding fluid has properties leading to low dispersibility of chips and low permeability through a grinding point as compared to water-insoluble grinding fluid and tends to cause chips to aggregate and clog on a surface of a grinding wheel and to generate a grinding burn caused thereby and, additionally, the continuous-generation gear grinding is in the following specific situations with respect to the difficulty in switching from the water-insoluble grinding fluid to the water-soluble grinding fluid.

First, the continuous-generation gear grinding is associated with a long contact circular arc length of a workpiece for a thread-shaped grinding wheel and tends to generate long chips as compared with normal grinding. Therefore, if the grinding fluid is water-soluble, the chips aggregating because of electrical charge easily tangle and, additionally, since the chips and the water-soluble grinding fluid generally do not blend well with each other and easily take in air, the tangling chips tend to form a large cotton-like lump of chips. These cotton-like chips cause a grinding burn, reduce the gear accuracy, and therefore make it difficult to switch the water-insoluble grinding fluid to the water-soluble grinding fluid. Second, since the regeneration of sharp cutting edges is not expected as a result of dressing performed in the continuous-generation gear grinding and the abrasive grains exposed on the surface of the thread-shaped grinding wheel are characteristically somewhat dulled immediately after the dressing, this also causes a grinding burn and makes it difficult to switch the water-insoluble grinding fluid to the water-soluble grinding fluid.

While the continuous-generation gear grinding uses a thread-shaped grinding wheel provided with a spiral groove and the grinding is performed by synchronous rotation through the spiral groove meshed with a tooth profile of a gear blank, a grinding-wheel pressure angle of the thread-shaped grinding wheel must be corrected to correct a tooth profile pressure angle, and the grinding-wheel pressure angle of the thread-shaped grinding wheel is corrected by shaping the tooth profile shape of the thread-shaped grinding wheel through dressing by a rotary dressing device. This dressing not only corrects the tooth profile shape of the thread-shaped grinding wheel but also regenerates the cutting edges of the abrasive grains on the surface to improve sharpness. However, although it is known that in typical rotary dressing, for example, in the case of cylindrical grinding, the cutting edges of the abrasive grains are most regenerated and improved in sharpness when the grinding wheel and a circular plate-shaped rotary dresser have a circumferential velocity ratio (the circumferential velocity of the rotary dresser/the circumferential velocity of the grinding wheel) of 1 in a down-dressing direction and that the sharpness decreases when a difference between the circumferential velocity ratio and 1 increases, the continuous-generation gear grinding typically uses a circumferential velocity ratio of 10 to 20 even in the down-dressing direction because of the mechanistic reason that the feed rate of the circular plate-shaped rotary dresser cannot be increased and the reason that the correction of the pressure angle of the thread-shaped grinding wheel is the main purpose. Therefore, the dressing in the continuous-generation gear grinding inevitably results in a grinding wheel surface having a large worn area with the abrasive grains collapsed on the surface of the thread-shaped grinding wheel rather than the regeneration of the sharp cutting edges.

The present invention was conceived in view of the situations and it is therefore an object of the present invention to provide a continuous-generation gear grinding method providing the gear grinding processability not inferior to water-insoluble grinding fluid by using water-soluble grinding fluid conventionally considered unsuitable for the continuous-generation gear grinding.

In view of the situations, as a result of various studies on the premise that the regeneration of sharp cutting edges is not expected because of the worn area of the abrasive grains increased due to a large circumferential velocity ratio between the grinding wheel and the circular plate-shaped rotary dresser as described above in the dressing of the continuous-generation gear grinding and that the abrasive grains exposed on the surface of the thread-shaped grinding wheel are characteristically somewhat dulled immediately after the dressing, the present inventors found out an unexpected fact that, contrary to the conventional knowledge that a coarser grain size of abrasive grains improves the sharpness, abrasive grains made finer than conventional cases shorten a chip length to make discharge performance higher and hardly cause chips to clog in a chip pocket on the surface of the grinding wheel, thereby preferably improving a grinding burn. In particular, it is common to use abrasive grains of F80 to F120 depending of a module of gears in the conventional continuous-generation gear grinding, such as the grain size of F120 when the module of gears is 1.5 to 4, the grain size of F90 when the module of gears is 2.75 to 6, and the grain size of F80 when the module of gears is 6 or more; however, the inventors found out that if a grinding wheel with abrasive grains having a grain size of F120 to F180 is used in the continuous-generation gear grinding, a shortened length of chips makes discharge performance higher and also the grinding burn is improved.

Since grinding chips are curled by themselves and have an easily tangling shape, the chips still easily tangle even when the chip length is simple shortened, and this tendency is remarkable in the water-soluble grinding fluid, which is inferior to the water-insoluble grinding fluid in dispersibility of chips. A size of grinding chips changes depending on a grinding condition and chip shapes differ depending on a difference in lubricity. Therefore, to bring out the capability for quickly discharging chips from a grinding wheel by using the water-soluble grinding fluid, it is necessary to use the water-soluble grinding fluid with the lubricity and the chip dispersibility made closer to the water-insoluble grinding fluid, and it is also discovered that an improvement derived from oil solution (grinding fluid) can be achieved by use of a surfactant and use of an extreme-pressure agent. The present invention was conceived based on this knowledge.

Means for Solving the Problem

That is, to achieve the above object, the principle of the present invention provides a continuous-generation gear grinding method (a) of conducting a gear grinding process such that while a thread-shaped grinding wheel is rotated around an axial center thereof and fed in an axial center direction, a position coming into contact with abrasive grains is constantly changed in the presence of a water-soluble grinding fluid by performing a grinding feed in a direction parallel to an axial center of the gear blank and by serially rotating the gear blank around the axial center, wherein (b) the grinding wheel is a vitrified grinding wheel having abrasive grains bonded by a vitrified bond with pores formed among the abrasive grains, and wherein (c) the abrasive grains have a grain size of F120 to F180.

Effects of the Invention

According to the continuous-generation gear grinding method of the principle of the present invention, since the vitrified grinding wheel has abrasive grains bonded by a vitrified bond with pores formed among the abrasive grains and the abrasive grains have a grain size of F120 to F180, a length of chips is shortened in the continuous-generation gear grinding that is associated with a long contact circular arc length of a workpiece for the thread-shaped grinding wheel and that has a tendency to generate long chips and, therefore, the chips hardly clog in chip pockets on the surface of the grinding wheel because of the increased chip discharge performance, which preferably improves the grinding burn. As a result, even when the water-soluble grinding fluid is used in the continuous-generation gear grinding, the gear grinding processability not inferior to water-insoluble grinding fluid is provided.

In one preferred form of the invention, the vitrified grinding wheel is a high-porosity vitrified grinding wheel having an abrasive grain volume fraction of 40 to 44 vol. %, more preferably an abrasive grain volume fraction of 42 to 44 vol. %. As a result, under the condition of using abrasive grains having a relatively fine grain size of F120 to F180, the grinding resistance of the grinding wheel is prevented from increasing while the grinding efficiency is maintained. An abrasive grain volume fraction less than 40 vol. % makes it difficult to maintain the shape of the grinding wheel and provide a uniform grinding wheel structure, and an abrasive grain volume fraction exceeding 44 vol. % results in high grinding resistance, easily causing a burn.

In another preferred form of the invention, in a frequency distribution chart of an abrasive grain area ratio that is a proportion of solid bodies including the abrasive grains per unit area of multiple portions in a grinding wheel cross section, the vitrified grinding wheel has homogeneity represented by a variation coefficient of 17% or less acquired by dividing the standard deviation of frequencies of the abrasive grain area ratio by the average value of the frequencies of the abrasive grain area ratio. As a result, the high-porosity vitrified grinding wheel with high homogeneity is acquired that preferably suppresses local clogging and collapsing of the grinding wheel and drop as well as burning of work material.

In a further preferred form of the invention, the abrasive grains are A-based (alumina-based) polycrystalline abrasive grains. As a result, roughness is reduced on a ground surface that is a flank of a gear, and the machining quality of the gear is improved.

In a still further preferred form of the invention, the water-soluble grinding fluid contains at least one selected from a group consisting of polyalkylene glycols and non-ionic surfactants and at least one selected from a group consisting of extreme-pressure agents in a metalworking fluid composition and is diluted with water before use such that a concentration during use is 2.5 mass % or more. Preferably, the water-soluble grinding fluid GF is a 5 to 20 mass % aqueous solution. The metalworking fluid composition less than 2.5 mass % makes it difficult to produce the effect. The metalworking fluid composition exceeding 20 mass % saturates the effect.

In a yet further preferred form of the invention, the metalworking fluid composition contains 0.5 to 20 mass % surfactant and/or polyalkylene glycols. More preferably, the metalworking fluid composition contains 2 to 15 mass % surfactant and/or polyalkylene glycols. The surfactant and/or polyalkylene glycols less than 0.5 mass % hardly produce the effect thereof. The surfactant and/or polyalkylene glycols equal to or less than 20 mass % can ensure a proper amount of another component for ensuring lubricity; however, the surfactant and/or polyalkylene glycols exceeding 20 mass % makes it difficult to ensure such an amount, making it difficult to provide the lubricity.

In still another preferred form of the invention, the surfactant may be a non-ionic surfactant with ethylene oxide and propylene oxide added thereto, such as a polyhydric alcohol type, an ester type, and an ester/ether type, for example, and polyethers that are surfactants having poly-alkylene glycol bound to another hydrophobic molecule, also produce the same effects as the non-ionic surfactant. For example, polyoxyalkylene alkyl ether, such as polyoxyethylene alkyl ether and polyoxyethylene polyoxypropylene alkyl ether, and polyethylene glycol polypropylene glycol block polymer, polyoxyphenyl ether, polyethylene glycol, and polypropylene glycol are preferably used.

In yet another preferred form of the invention, the metalworking fluid composition contains a 5 to 50 mass % extreme-pressure agent. The extreme-pressure agent less than 5 mass % hardly produces the effect thereof. The extreme-pressure agent equal to or less than 50 mass % can ensure a proper amount of another component for ensuring other performances including washing performance; however the extreme-pressure agent exceeding 50 mass % makes it difficult to ensure such an amount, making it impossible to provide washing performance etc.

In further another preferred form of the invention, the extreme-pressure agent contained in the metalworking fluid composition is a sulfur-based extreme-pressure agent such as sulfide mineral oil, sulfide fat, sulfide ester, and polysulfide.

BRIEF DESCRIPTION OF THE DRAWINGS

FIG. 10 is a chart of samples Nos. 1 to 8 of water-soluble grinding fluids having various compositions used in the continuous-generation gear grinding shown in FIG. 2 using the vitrified grinding wheel produced in accordance with the processes of FIG. 3, and chip dispersibility evaluation conducted by using the samples Nos. 1 to 8.

FIG. 11 is a chart of samples Nos. 9 to 16 of water-soluble grinding fluids having various compositions, and chip dispersibility evaluation conducted by using the samples Nos. 9 to 16, as FIG. 10.

FIG. 12 is a chart of samples Nos. 17 to 24 of water-soluble grinding fluids having various compositions, and chip dispersibility evaluation conducted by using the samples Nos. 17 to 24, as FIG. 10.

FIG. 13 is a chart of samples Nos. 25 to 30 of water-soluble grinding fluids having various compositions, and lubricity evaluation conducted by using the samples Nos. 25 to 30.

MODE FOR CARRYING OUT THE INVENTION

An example of the present invention will now be described in detail with reference to the drawings.

Example

Figure 1:
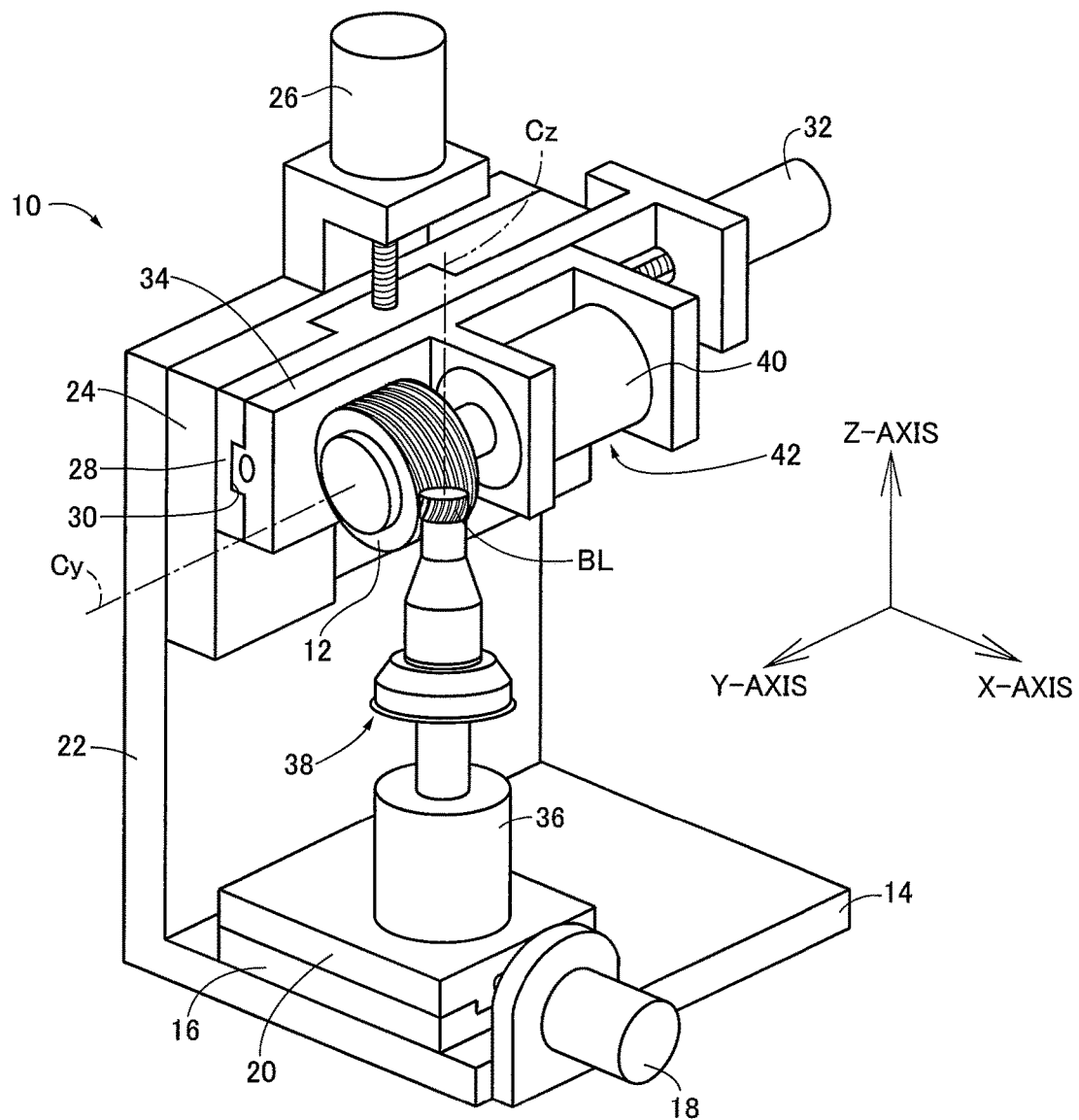
FIG. 1 is a perspective view for explaining a main configuration of a continuous-generation gear grinding machine that is an example of the present invention.
Figure 2:
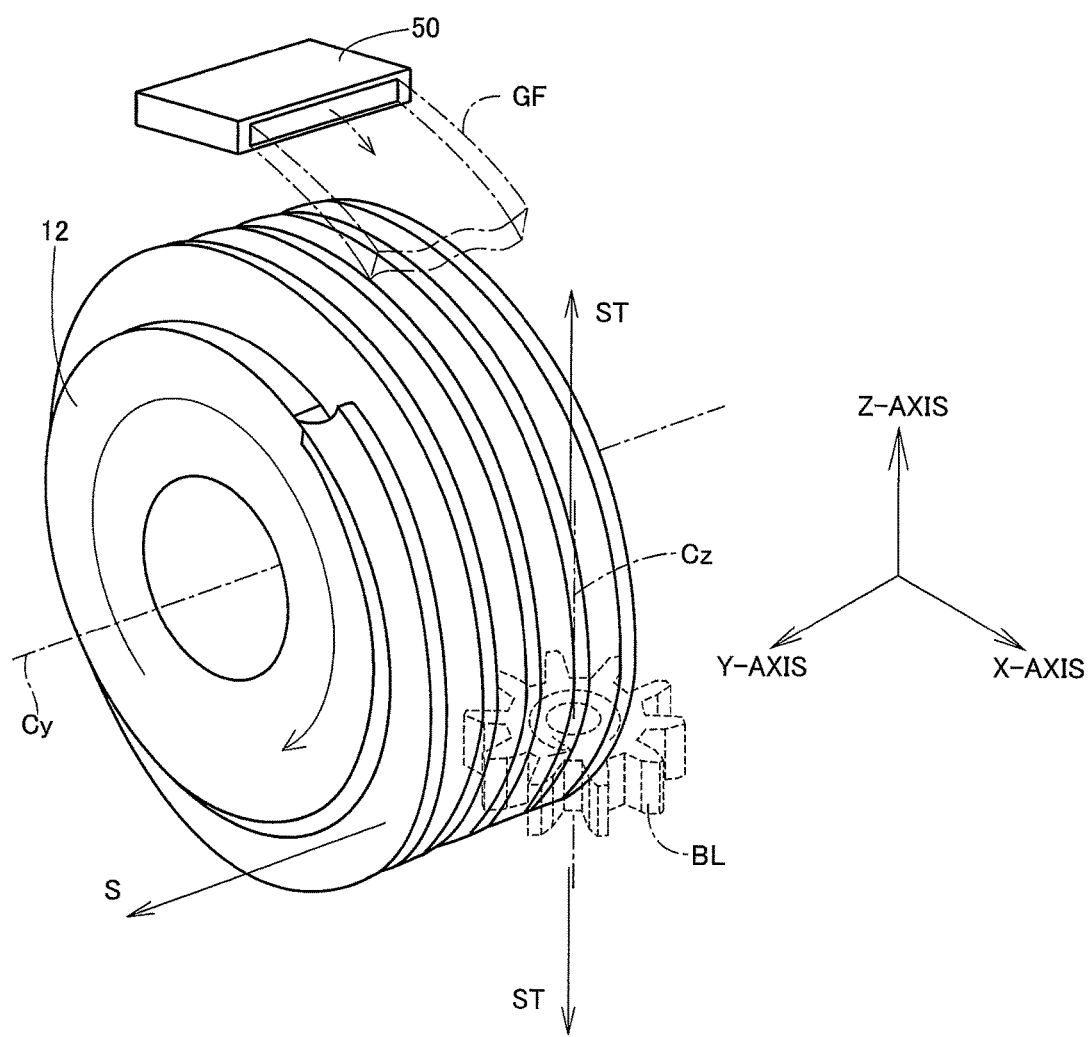
FIG. 2 is a perspective view for explaining continuous-generation gear grinding performed on the continuous-generation gear grinding machine of FIG. 1 by using a vitrified grinding wheel and a gear blank.

FIG. 1 is a perspective view for explaining a main configuration of an example of a continuous-generation gear grinding machine 10 performing continuous-generation gear grinding so-called shift grinding by using a water-soluble grinding fluid GF (see FIG. 2). The continuous-generation gear grinding machine 10 includes a high-porosity porous thread vitrified grinding wheel 12 with spirally arranged teeth having the same cross-sectional shape as outer circumferential teeth formed on a gear blank BL such that, for example, the vitrified grinding wheel 12 is rotatable around an axial center Cy parallel to a horizontal Y-axis, relatively movable to the gear blank BL in a shift direction S that is an axial center Cy direction parallel to the Y-axis, relatively movable to the gear blank BL in an axial feed direction parallel to a Z-axis direction orthogonal to the Y-axis, and relatively movable to the gear blank BL in an infeed direction parallel to an X-axis direction orthogonal to the Y-axis and the Z-axis. The continuous-generation gear grinding machine 10 holds the gear blank BL rotatably around an axial center Cz parallel to the Z-axis.

Specifically, the continuous-generation gear grinding machine 10 includes an X-axis table 20 that is guided in the X-axis direction by an X-axis direction guiding member 16 fixed onto a base 14 and that is positioned in the X-axis direction by an X-axis positioning motor 18, a Z-axis table 28 that is guided in the Z-axis direction by a Z-axis direction guiding member 24 fixed to a support wall 22 erected from the base 14 and that is positioned in the Z-axis direction by a Z-axis positioning motor 26, a Y-axis table 34 that is guided in the Y-axis direction by a Y-axis direction guiding groove 30 formed on the Z-axis table 28 and that is positioned in the Y-axis direction by a Y-axis positioning motor 32, a workpiece rotation drive device 38 fixedly disposed on the X-axis table 20 to rotatably support the gear blank BL and having a workpiece drive motor 36 rotationally driving the gear blank BL around the axial center Cz, and a grinding wheel rotation drive device 42 fixedly disposed on the Y-axis table 34 to rotatably support the vitrified grinding wheel 12 and having a grinding wheel drive motor 40 rotationally driving the vitrified grinding wheel 12 around the axial center Cy.

As shown in detail in FIG. 2, the continuous-generation gear grinding machine 10 uses the high-porosity porous thread vitrified grinding wheel 12 to apply the continuous-generation gear grinding to an outer circumferential surface of the gear blank BL. In particular, the continuous-generation gear grinding machine 10 drives the X-axis table 20, the Z-axis table 28, and the Y-axis table 34 by the X-axis positioning motor 18, the Z-axis positioning motor 26, and the Y-axis positioning motor 32 in accordance with a prestored program to perform reciprocating grinding feed with a predetermined grinding stoke ST in the Z-axis direction, i.e., an axial direction, parallel to the axial center Cz of the gear blank BL that is a workpiece while the vitrified grinding wheel 12 is rotated around the axial center Cy and fed in the axial center Cy direction, i.e., the shift direction S, and serially rotates the gear blank BL in a synchronized manner around the axial center Cz, so that a grinding process of helical teeth or straight teeth is performed on the outer circumferential surface of the gear blank BL always with a new grinding surface, i.e., always with new abrasive grains, in the presence of the water-soluble grinding fluid GF widely supplied from a coolant nozzle 50 to suppress a grinding wheel wear of the vitrified grinding wheel 12, thereby applying the continuous-generation gear grinding to the outer circumferential surface of the gear blank BL with stable accuracy and high machining efficiency.

The vitrified grinding wheel 12 has a porous vitrified grinding wheel structure made of relatively fine general abrasive grains such as fused alumina abrasive grains (alundum) bonded by vitreous vitrified bond. This vitrified grinding wheel 12 is a high-porosity vitrified grinding wheel having an abrasive grain rate of 45 vol. % or less as described later.

The abrasive grains have, for example, a grain size of F120 to F180 in Macrogrits of JISR6001 or ISO8486-1, i.e., an average abrasive grain size of about 80 μm to 125 μm, and account for a rate of 40 to 44 vol. % of the high-porosity vitrified grinding wheel structure, for example. The vitrified bond account for a rate of 7 to 12 vol. % of the high-porosity vitrified grinding wheel structure, for example. The pores as the rest are formed in the high-porosity vitrified grinding wheel structure at a rate of 47 to 50 vol. %, for example.

The vitrified bond are made of, for example, well-known silica glass, borosilicate glass, or glass ceramics. A glass composition preferable for the vitrified bond is, for example, $SiO_2$: 40 to 70 wt %, $Al_2O_3$: 10 to 20 wt %, $B_2O_3$: 0 to 20 wt %, RO (alkali earth metal): 20 to 10 wt %, and $R_2O$: 2 to 10 wt %.

Figure 3:
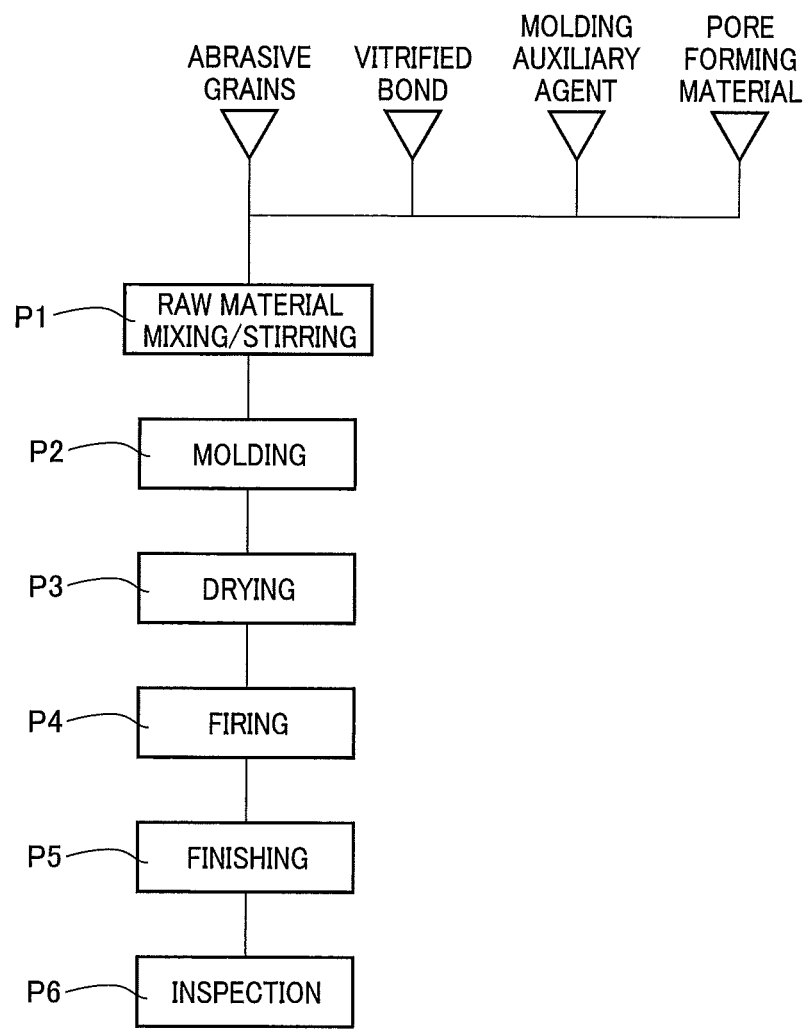
FIG. 3 is a process diagram for explaining processes of producing the vitrified grinding wheel of FIG. 2.

FIG. 3 is a process diagram for explaining processes of producing the vitrified grinding wheel 12. In FIG. 3, first, at a raw material mixing/stirring process P1, a grinding wheel raw material of the vitrified grinding wheel 12 is prepared. For example, after measuring the weights of general abrasive grains based on $Al_2O_3$ etc. known as alumina abrasive grains and having a grain size of F120 to F180 (an average grain size D of 80 to 125 μm), vitreous vitrified bond (inorganic binding agent) based on $ZrO_2$—$B_2O_3$, $B_2O_3$—$Al_2O_3$—$SiO_2$, $R_2O$—$Al_2O_3$—$SiO_2$, etc., an organic binder for molding (caking agent or paste material) such as dextrin and carboxymethyl cellulose for generating a mutual caking power to a certain extent at the time of molding, and a pore forming material having an average grain size P smaller than the same size of the average grain size D of the abrasive grains at preset proportions, these materials are mixed with each other to prepare the grinding wheel row material. Table 1 describes an example of blending proportions of the grinding wheel row material at the raw material mixing/stirring process P1.

TABLE 1

| raw material name | proportion |
| --- | --- |
| alumina abrasive grains (average grain size: 125 μm) | 40 vol. % |
| pore forming material | 10 vol. % |
| vitrified bond | 14 vol. % |
| paste material | 6 vol. % |

The pore forming material is a material artificially or actively forming pores (spaces) substantially in the vitrified grinding wheel structure after a firing treatment at a firing process P4 described later and is, for example, hollow or solid naphthalene, DMT, alumina balloons (alumina hollow bodies), walnut powder, polystyrene, and crosslinking acrylic.

At a molding process P2, the mixed grinding wheel raw material is put into a molding cavity of a predetermined molding die and the grinding wheel material raw material is pressurized by a pressing device to mold a molded body having the same shape as the vitrified grinding wheel 12 shown in FIG. 2. At the firing process P4 after going through a drying process P3 of drying the molded body, the molded body is baked at, for example, a temperature of 900 to 1050° C., to acquire the vitrified grinding wheel 12 shown in FIG. 2. Subsequently, dimensional finishing is applied at a finishing process P5 and a product inspection is conducted at an inspection process P6.

Figure 4:
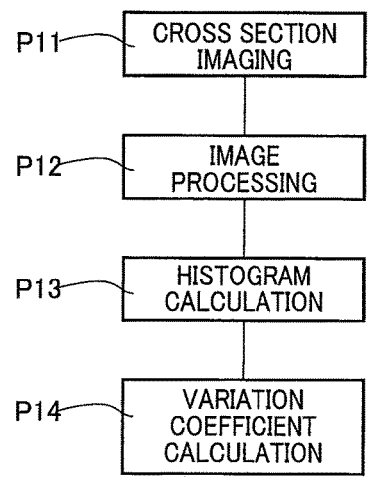
FIG. 4 is a process diagram for explaining a method for evaluating homogeneity in the vitrified grinding wheel.
Figure 5:
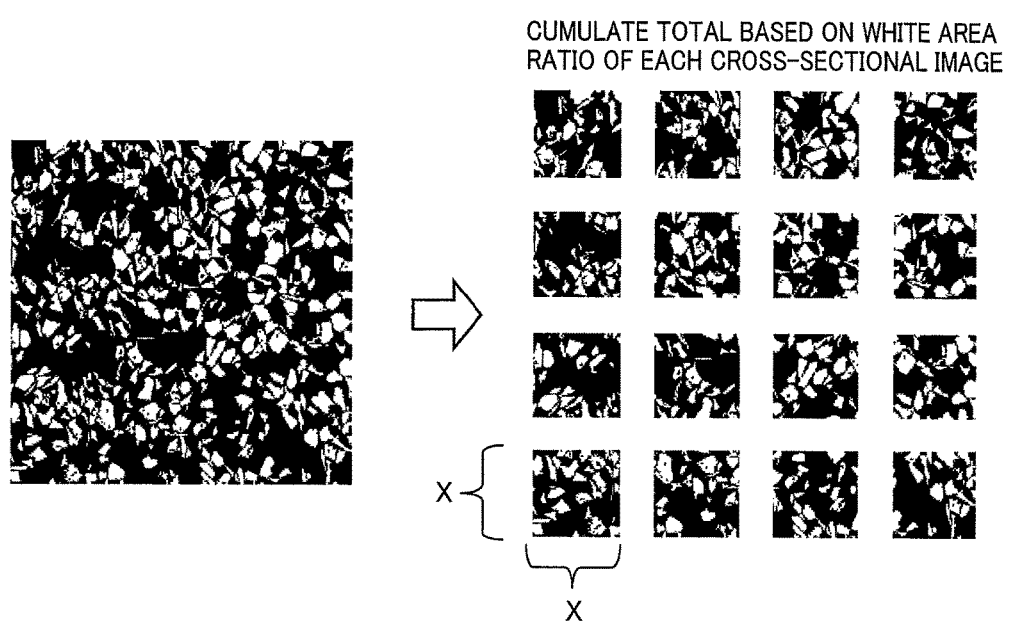
FIG. 5 is a diagram for explaining a method of setting divided images (unit areas) of a cross-sectional image of the vitrified grinding wheel at a frequency distribution chart calculation process of FIG. 4.
Figures 6, 7:
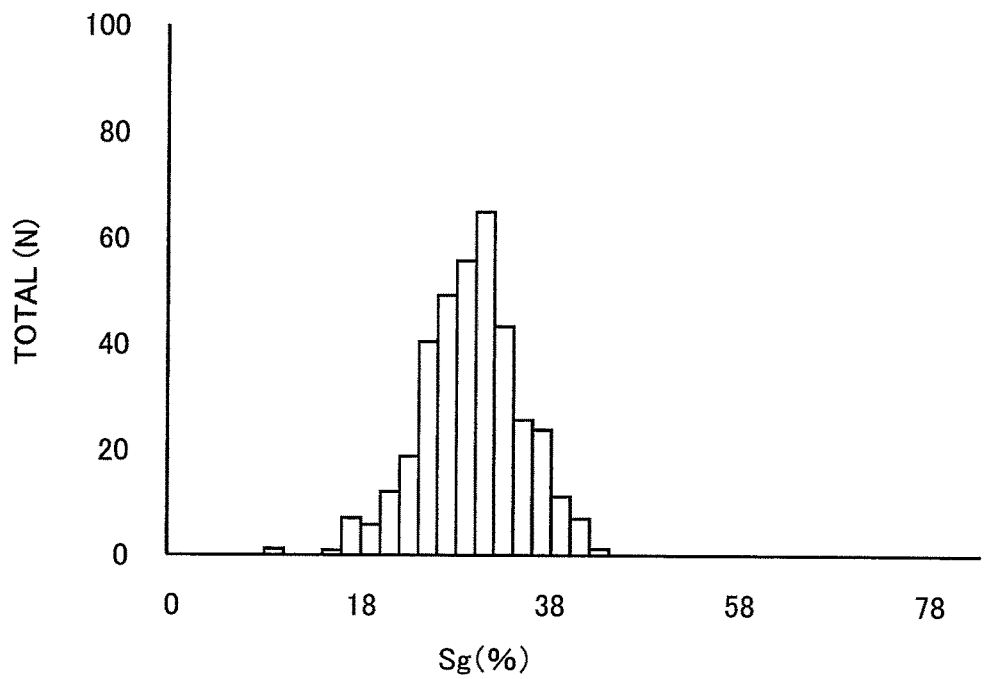
FIG. 6 is a frequency distribution chart acquired from binarization of each of the cross-sectional images of FIG. 5.
FIG. 7 is a chart of the structures of Examples 1 to 3 and Comparison Example 1 produced in accordance with the processes of FIG. 3 for a continuous-generation gear grinding process test and the burn evaluation in a grinding test conducted by using the Examples.

FIG. 4 is a process diagram for explaining homogeneity in the structure of the vitrified grinding wheel 12 using a method of evaluating frequency distribution of abrasive grain area ratios by a computer for evaluation. In FIG. 4, at a cross section imaging process P11, the cross section of the vitrified grinding wheel 12 is input as an image enlarged through a microscope. Subsequently, at an image processing process P12, an image process by a computer is used for the micrograph acquired at the cross section imaging process P11 to execute a binarization process of the image at a certain focal depth position, thereby generating a monochrome cross-sectional image shown on the left side of FIG. 5. In this cross-sectional image, black portions represent spaces, i.e., pores, and white portions represent solid bodies, for example, abrasive grains and vitrified bond. At a subsequent frequency distribution chart calculation process P13, the cross-sectional image is divided into squares having a side of 300 to 600 (μm), for example. Subsequently, an area proportion (abrasive grain area ratio) Sg (%) of solid bodies of the white portions is calculated for each of the divided regions as shown on the right side of FIG. 5, and a frequency distribution chart is made with a horizontal axis indicative of the magnitude of the area proportion Sg and a vertical axis indicative of the cumulative number of divided regions as shown in FIG. 6. At a variation coefficient calculation process P14, a standard deviation σ and an average value of the abrasive grain area ratio frequency are calculated from the frequency distribution of the abrasive grain area ratio represented by the made frequency distribution chart. The variation coefficient is acquired by division of the standard deviation σ by the average value and conversion into a percentage, and a smaller variation coefficient corresponds to a higher evaluation value for evaluating the homogeneity of the vitrified grinding wheel structure. If a side of the squares of the divided regions is smaller than 300 μm, one square may have no more than five abrasive grains per square at F120 and, if the side exceeds 600 μm, 30 or more abrasive grains enter one square and make the standard deviation σ smaller more than necessary, preventing correct evaluation of variations when the grains are finer than F150. To make a highly accurate frequency distribution chart, the division number of the cross-sectional image must be 100 or more and is more preferably 200 or more.

Examples of experiments conducted by the inventors will hereinafter be described. First, test grinding wheels of Examples 1, 2, 3, and Comparison Example 1 of FIG. 7 were produced as shown in FIG. 3. Examples 1, 2, 3, and Comparison Example 1 shown in FIG. 7 are thread-shaped grinding wheels having the outer diameter of 300 mm×the inner diameter of 125 mm×the length (thickness) of 150 mm and five helical grooves and are common in that the grinding wheels are vitrified grinding wheels having the alumina abrasive grains MA/SN, the grade H, and the structure 10 as well as a variation coefficient of 17% or less in the frequency distribution chart shown in FIG. 6. However, a difference is that the abrasive grains of Comparison Example 1 have the grain size of F80 while the abrasive grains of Examples 1, 2, and 3 have the grain size of F120, F150, and F180. The present inventors discovered that a finer grain size of the abrasive grains makes the variation coefficient smaller as shown in FIG. 7. A worn area per grain can be made smaller and the occurrence frequency thereof can be made uniform. The continuous-generation gear grinding was subsequently performed by using the test grinding wheels of Examples 1, 2, 3, and Comparison Example 1 under the following test conditions.

(Continuous-generation gear grinding test conditions)

Grinding fluid: water-soluble grinding fluid (sample No. 7)

| Workpiece module | pressure angle | teeth number | material | hardness |
|---|---|---|---|---|
| 2.4 | 17.5 | 53 | SCM420 | 58 (HRC) |

Continuous-generation gear grinding machine: ZE-24B manufactured by Mitsubishi Heavy Industries, Ltd.

| Machining conditions | rough grinding | finish grinding |
|---|---|---|
| machining direction | climb | conventional |
| grinding fluid supply amount | 200 L/min | 200 L/min |
| grinding wheel rotation number (min$^{-1}$) | 3300 | 3500 |
| infeed amount (mm) | 0.25 | 0.05 |
| axial feed (mm/rev) | 0.70 | 0.30 |
| dressing interval (gears/dressing) | 40 | 40 |

Figures 8, 9:
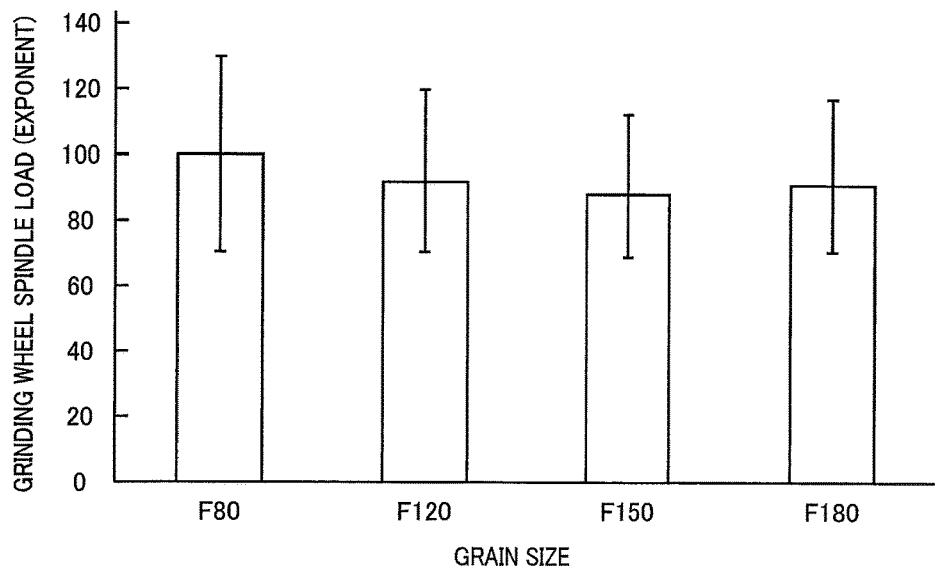
FIG. 8 is a chart relatively showing a grinding wheel spindle load in the continuous-generation gear grinding process test conducted by using Examples 1 to 3 and Comparison Example 1 produced in accordance with the processes of FIG. 3.
FIG. 9 is a diagram for explaining a grinding process accuracy when the continuous-generation gear grinding process test is conducted by using a test grinding wheel of Example 1 of FIG. 7.

FIG. 7 shows evaluation of burning of the grinding test result. Although the test grinding wheels of Examples 1, 2, and 3 caused no burn in the continuous grinding of 40 gears/dressing, the test grinding wheel of Comparison Example 1 caused a burn at a 16th gear. FIG. 8 shows a grinding wheel spindle load of the grinding test result. The grinding wheel spindle load corresponds to sharpness and is a drive electric power KW (indicated as a percentage relative to rated electric power) of a grinding wheel spindle and is indicated by a relative value when Comparison Example 1 is assumed to have a grinding wheel spindle load of 100. According to FIG. 8, the test grinding wheels of Examples 1, 2, and 3 have the load reduced by 8 to 12% and improved in sharpness as compared to the test grinding wheel of Comparison Example 1. FIG. 9 shows changes in machining accuracy of the test grinding wheel of Example 1 until 40 cuts. The respective numerical values sufficiently within the standard were acquired in terms of tooth profile pressure angle error, tooth profile bias, tooth profile roundness, lead angle error, and crowning, and the highly accurate gear grinding was achieved.

The water-soluble grinding fluid GF is a 2.5 mass % or more aqueous solution of a metalworking fluid composition. This metalworking fluid composition contains a surfactant and/or polyalkylene glycols for increasing the washing performance on the grinding wheel surface to prevent welding of a grinding surface of the vitrified grinding wheel, and an extreme-pressure agent for increasing the lubricity of the grinding wheel surface to reduce the grinding wheel wear and, for example, a metalworking fluid composition sample No. 5 shown in FIG. 10 described later was used in the grinding process test. With regard to the surfactant and/or polyalkylene glycols, preferably, the surfactant may be a non-ionic surfactant with ethylene oxide and propylene oxide added thereto, such as a polyhydric alcohol type, an ester type, and an ester/ether type, for example, and polyethers are preferably used as surfactants having polyoxyalkylene alkyl ether, such as polyoxyethylene alkyl ether and polyoxyethylene polyoxypropylene alkyl ether, and polyalkylene glycol such as polyethylene glycol polypropylene glycol block polymer, polyoxyphenyl ether, polyethylene glycol, and polypropylene glycol, bound to another hydrophobic molecule, for example. The extreme-pressure agent is preferably sulfur-based and is, for example, a sulfur-based extreme-pressure agent such as sulfide mineral oil, sulfide fat, sulfide ester, and polysulfide.

Description will hereinafter be made of an evaluation test conducted by the present inventors for evaluating a relation between a content percentage of the surfactant and the extreme-pressure agent contained in the metalworking fluid composition and the dispersibility of the metalworking fluid composition aqueous solution. First, metalworking fluid composition samples Nos. 1 to 24 shown in FIGS. 10 to 12 were produced. The samples Nos. 1, 9, and 17 contain a mineral oil and/or an ester compound at a concentration of 31 mass % without containing a surfactant and/or polyalkylene glycols. The samples Nos. 2 to 8 contain a mineral oil and/or an ester compound at a concentration of 30.8 mass % to 6 mass % and a polyoxyethylene alkyl ether type surfactant at a concentration of 0.2 mass % to 25 mass %. The samples Nos. 10 to 16 contain a mineral oil and/or an ester compound at a concentration of 30.8 mass % to 6 mass % and a polyoxyethylene phenyl ether type surfactant at a concentration of 0.2 mass % to 25 mass %. The samples Nos. 18 to 24 contain a mineral oil and/or an ester compound at a concentration of 30.8 mass % to 6 mass % and a polyoxypropylene glycol type surfactant at a concentration of 0.2 mass % to 25 mass %. Subsequently, a 5 mass % aqueous solution (water-soluble grinding fluid) of each of the metalworking fluid compositions was put into a 100 ml glass-stoppered measuring cylinder and 0.3 g of grinding chips were added, lightly shaken up and down, and allowed to stand for one hour such that the chips are blended with the sample fluid. The fluid was then shaken up and down and allowed to stand still and a dispersion state of chips after about one minute was visually observed. The dispersion state was evaluated in three grades indicated by x (chips precipitate, float, and attach to a wall surface without dispersion and fluid is relatively transparent), Δ (chips precipitate and float with slight dispersion), and ○ (chips disperse and fluid is opaque).

As shown in FIGS. 10 to 12, although the 5 mass % aqueous solutions of the samples Nos. 1, 2, 9, 10, 17, and 18 exhibited low dispersibility of chips, the samples Nos. 3 to 8, 11 to 16, and 19 to 24 provided favorable dispersibility. In other words, favorable dispersibility was acquired from the water-soluble grinding fluids that are 5 mass % aqueous solutions of the metalworking fluid composition when the content of the surfactant and/or polyalkylene glycols is within a range of 0.5 mass % to 20 mass % of the metalworking fluid composition. The surfactant and/or polyalkylene glycols contained in the metalworking fluid composition are contained in the metalworking fluid composition at 0.5 to 20 mass % and more preferably contained at 2 to 15 mass %. The surfactant and/or polyalkylene glycols less than 0.5 mass % hardly produce the effect thereof and the surfactant and/or polyalkylene glycols equal to or less than 20 mass % can ensure a proper amount of another component for ensuring the lubricity; however, the surfactant and/or polyalkylene glycols exceeding 20 mass % make it difficult to ensure such an amount, making it difficult to provide other properties such as lubricity.

The present inventors then produced metalworking fluid composition samples Nos. 25 to 30 shown in a table of FIG. 13 for conducting a grinding wheel friction abrasion test and a stick-slip test for a plurality of types of metalworking fluid compositions containing the extreme-pressure agent at different concentrations by using 20 mass % aqueous solutions thereof under the following stick-slip test conditions. While the samples Nos. 25 to 30 contain a mineral oil and/or an ester compound at six levels of concentration from 51 mass % to 0 mass %, the sample No. 25 does not contain the extreme-pressure agent and the sample No. 25 contains neither the non-ionic surfactant nor polyalkylene glycols. The samples Nos. 26 to 30 contain a sulfur-based extreme-pressure agent at five levels of concentration from 0 mass % to 50 mass %.

(Stick-Slip Test Conditions)
Test machine: stick-slip testing machine manufactured by Shinko Engineering Co., Ltd.
Test steel: SPCC-SB
Test steel ball: SUJ-2 (spherical diameter: 3/16 inches)
Load: 4 kg
Sliding speed: 4 mm/s A pair of test pieces was slid at constant load and speed under the stick-slip test conditions by using a 20 mass % aqueous solution (water-soluble grinding fluid) of each of the samples and a frictional force in this case was measured by a strain gauge to obtain a friction coefficient. When this friction coefficient is smaller, the water-soluble grinding fluid is evaluated as having higher lubricity and a higher burn prevention effect.

As shown in the table of FIG. 13, while the 20 mass % aqueous solutions (water-soluble grinding fluids) of the samples Nos. 25 and 26 have a high friction coefficient and low lubricity, the 20 mass % aqueous solutions (water-soluble grinding fluids) of the samples Nos. 27 to 30 have a low friction coefficient and high lubricity. In other words, favorable lubricity was acquired from the 20 mass % aqueous solutions (water-soluble grinding fluids) of the metalworking fluid compositions when the content of the extreme-pressure agent is within a range of 5 mass % to 50 mass % of the metalworking fluid composition. The extreme-pressure agent contained in the metalworking fluid composition hardly produces the effect thereof at less than 5 mass % and the extreme-pressure agent equal to or less than 50 mass % can ensure a proper amount of another component for ensuring other performances including washing performance; however the extreme-pressure agent exceeding 50 mass % makes it difficult to ensure such an amount, making it impossible to provide washing performance etc.

As described above, according to a continuous-generation gear grinding method of this example, since the vitrified grinding wheel 12 has abrasive grains bonded by vitrified bond with pores formed among the abrasive grains and the abrasive grains have a grain size of F120 to F180, a length of chips is shortened in the continuous-generation gear grinding that is associated with a long contact circular arc length of the gear blank (workpiece) BL for the thread-shaped grinding wheel 12 and that has a tendency to generate long chips and, therefore, the chips hardly clog in chip pockets on the surface of the vitrified grinding wheel 12 because of the increased chip discharge performance, which preferably improves the grinding burn. As a result, even when the water-soluble grinding fluid GF is used in the continuous-generation gear grinding, the gear grinding processability not inferior to water-insoluble grinding fluid is provided.

Since the vitrified grinding wheel 12 of this example is a high-porosity vitrified grinding wheel having an abrasive grain volume fraction of 38 to 44 vol. %, more preferably an abrasive grain volume fraction of 38 to 42 vol. % and, therefore, an abrasive grain area ratio is maintained at a proper value under the condition of using abrasive grains having a relatively fine grain size of F120 to F180, the grinding resistance of the grinding wheel is prevented from increasing while the grinding efficiency is maintained, and the high-porosity vitrified grinding wheel is acquired that preferably suppresses local clogging and collapsing and drop as well as burning of work material. An abrasive grain volume fraction less than 38 vol. % results in low grinding efficiency, and an abrasive grain volume fraction exceeding 44 vol. % results in high grinding resistance, easily causing a burn.

In a frequency distribution chart of an abrasive grain area ratio that is a proportion of solid bodies including the abrasive grains per unit area of multiple portions in a grinding wheel cross section, the vitrified grinding wheel 12 of this example has homogeneity of 17 or less represented as a value of a variation coefficient acquired by dividing the standard deviation of the abrasive grain area ratio by the average value of the abrasive grain area ratio. As a result, the high-porosity vitrified grinding wheel with high homogeneity is acquired that preferably suppresses local clogging and collapsing of the grinding wheel and drop as well as burning of work material.

Since the abrasive grains contained in the vitrified grinding wheel 12 of this example are A-based (alumina-based) polycrystalline abrasive grains, roughness is reduced on a ground surface that is a flank of a gear, and the machining quality of the gear is improved.

The water-soluble grinding fluid GF of this example is acquired by diluting the metalworking fluid composition ("stock solution" before dilution with water; the same applies hereinafter unless otherwise stated) containing a non-ionic surfactant or polyalkylene glycols and the extreme-pressure agent with water to 2.5 mass % or more. Preferably, the water-soluble grinding fluid GF is a 2.5 to 20 mass % aqueous solution. Since the water-soluble grinding fluid GF is diluted as described above, the stock solution can easily be handled. The metalworking fluid composition less than 2.5 mass % makes it difficult to produce the effect. The metalworking fluid composition exceeding 20 mass % saturates the effect.

The metalworking fluid composition contained in the water-soluble grinding fluid GF of this example contains 0.5 to 20 mass % surfactant and/or polyalkylene glycols. More preferably, the metalworking fluid composition contains 2 to 15 mass % surfactant and/or polyalkylene glycols. The surfactant and/or polyalkylene glycols less than 0.5 mass % hardly produce the effect thereof. The surfactant and/or polyalkylene glycols equal to or less than 20 mass % can ensure a proper amount of another component for ensuring lubricity; however, the surfactant and/or polyalkylene glycols exceeding 20 mass % makes it difficult to ensure such an amount, making it difficult to provide the lubricity.

The metalworking fluid composition contained in the water-soluble grinding fluid GF of this example contains a 5 to 50 mass % extreme-pressure agent. The extreme-pressure agent less than 5 mass % hardly produces the effect thereof. The extreme-pressure agent equal to or less than 50 mass % can ensure a proper amount of another component for ensuring other performances including washing performance; however the extreme-pressure agent exceeding 50 mass % makes it difficult to ensure such an amount, making it impossible to provide washing performance etc.

Although the example of the present invention has been described in detail with reference to the drawings, the present invention is not limited to this example and may be implemented in other forms.

For example, the continuous-generation gear grinding machine 10 used in the example includes the X-axis table 20 that is guided in the X-axis direction by the X-axis direction guiding member 16 fixed onto the base 14 and that is positioned in the X-axis direction by the X-axis positioning motor 18, the Z-axis table 28 that is guided in the Z-axis direction by the Z-axis direction guiding member 24 fixed to the support wall 22 erected from the base 14 and that is positioned in the Z-axis direction by the Z-axis positioning motor 26, the Y-axis table 34 that is guided in the Y-axis direction by the Y-axis direction guiding groove 30 formed on the Z-axis table 28 and that is positioned in the Y-axis direction by the Y-axis positioning motor 32, the workpiece rotation drive device 38 fixedly disposed on the X-axis table 20 to rotatably support the gear blank BL and having the workpiece drive motor 36 rotationally driving the gear blank BL around the axial center Cz, and the grinding wheel rotation drive device 42 fixedly disposed on the Y-axis table 34 to rotatably support the vitrified grinding wheel 12 and having the grinding wheel drive motor 40 rotationally driving the vitrified grinding wheel 12 around the axial center Cy. However, an X-axis table positioning the support wall 22 in the X-axis direction may be disposed instead of the X-axis table 20 having the workpiece rotation drive device 38 placed thereon; a Y-axis table positioning the workpiece rotation drive device 38 in the Y-axis direction may be disposed instead of the Y-axis table 34 positioning the vitrified grinding wheel 12 in the Y-axis direction; and a Z-axis table positioning the workpiece rotation drive device 38 in the Z-axis direction may be disposed instead of the Z-axis table 28 positioning the vitrified grinding wheel 12 in the Z-axis direction. In short, the vitrified grinding wheel 12 may be included such that, for example, the vitrified grinding wheel 12 is rotatable around the axial center Cy parallel to the horizontal Y-axis, relatively movable to the gear blank BL in the shift direction S that is the axial center Cy direction parallel to the Y-axis, relatively movable to the gear blank BL in the axial feed direction parallel to the Z-axis direction orthogonal to the Y-axis, and relatively movable to the gear blank BL in the infeed direction parallel to the X-axis direction orthogonal to the Y-axis and the Z-axis.

The above description is merely an example and, although not exemplarily illustrated one by one, the present invention can be implemented in variously modified and improved forms based on the knowledge of those skilled in the art without departing from the spirit thereof.

NOMENCLATURE OF ELEMENTS

10: continuous-generation gear grinding machine
12: thread vitrified grinding wheel
GF: water-soluble grinding fluid
BL: gear blank
Cy: axial center of the grinding wheel
Cz: axial center of the gear blank

The invention claimed is:

1. A continuous-generation gear grinding method of conducting a gear grinding process on an outer circumferential surface of a gear blank such that while a thread-shaped grinding wheel is rotated around an axial center thereof and fed in an axial center direction, a position of the gear blank coming into contact with abrasive grains is constantly changed in the presence of a water-soluble grinding fluid by performing a grinding feed in a direction parallel to an axial center of the gear blank and by serially rotating the gear blank around the axial center,
   the grinding wheel being a vitrified grinding wheel having abrasive grains bonded by a vitrified bond with pores formed among the abrasive grains,
   the abrasive grains having a grain size of F120 to F180, and
   in a frequency distribution chart of an abrasive grain area ratio that is a proportion of solid bodies including the abrasive grains per unit area of multiple portions in a cross section of the grinding wheel, the vitrified grinding wheel having homogeneity represented by a variation coefficient of 17 or less acquired by dividing a standard deviation of the abrasive grain area ratio by an average value of the abrasive grain area ratio.

2. The continuous-generation gear grinding method according to claim 1, wherein the vitrified grinding wheel has an abrasive grain volume fraction of 40 to 44 vol. %.

3. The continuous-generation gear grinding method according to claim 1, wherein the abrasive grains are A-based (alumina-based) polycrystalline abrasive grains.

4. The continuous-generation gear grinding method according to claim 1, wherein the water-soluble grinding fluid contains at least one selected from a group consisting of polyalkylene glycols and non-ionic surfactants and at least one selected from a group consisting of extreme-pressure agents in a metalworking fluid composition and is diluted with water before use such that a concentration during use is 2.5 mass % or more.

5. The continuous-generation gear grinding method according to claim 4, wherein the metalworking fluid composition contains 0.5 to 20 mass % non-ionic surfactant and polyalkylene glycols.

6. The continuous-generation gear grinding method according to claim 4, wherein the metalworking fluid composition contains a 5 to 50 mass % extreme-pressure agent.

* * * * *